United States Patent [19]
Joensuu et al.

[11] Patent Number: 5,905,952
[45] Date of Patent: May 18, 1999

[54] DYNAMICALLY CREATED A-INTERFACE WITHIN A MOBILE NETWORK

[75] Inventors: Erkki Joensuu, Siuntio, Finland; Eric Valentine, Plano, Tex.; Michael Coyne, Stockholm, Sweden; Ari Peltonen, Aachen, Germany

[73] Assignee: Ericsson Inc., Research Triangle Park, N.C.

[21] Appl. No.: 08/749,627

[22] Filed: Nov. 18, 1996

[51] Int. Cl.$^6$ .............................. H04M 11/00; H04Q 7/22
[52] U.S. Cl. .......................... 455/433; 455/428; 455/445
[58] Field of Search .................................. 455/427, 428, 455/432, 433, 445

[56] References Cited

U.S. PATENT DOCUMENTS

| | | | |
|---|---|---|---|
| 5,400,390 | 3/1995 | Salin | 455/433 |
| 5,497,412 | 3/1996 | Lannen et al. | 455/432 |
| 5,583,916 | 12/1996 | Maenpaa | 455/433 |
| 5,711,002 | 1/1998 | Foti | 455/433 |
| 5,787,360 | 7/1998 | Johnston et al. | 455/433 |
| 5,832,382 | 11/1998 | Alperovich | 455/433 |

FOREIGN PATENT DOCUMENTS

| | | |
|---|---|---|
| 0 462 728 | 6/1991 | European Pat. Off. . |
| 0 708 571 | 10/1995 | European Pat. Off. . |
| WO 94/21090 | 9/1994 | WIPO . |
| WO 95/28063 | 4/1995 | WIPO . |
| WO 96/07277 | 8/1995 | WIPO . |

OTHER PUBLICATIONS

PCT Search Report, Aug. 27, 1998, PCT/US 97/21193.

*Primary Examiner*—Willis R. Wolfe
*Attorney, Agent, or Firm*—Jenkens & Gilchrist, P.C.

[57] ABSTRACT

A call is originated from a mobile station being served by a visited mobile switching center (MSC) and associated with a particular MSC as a home MSC. A base station subsystem (BSS) connected to the visited MSC dynamically establishes an A-interface with an application module within the home MSC transparently through the visited MSC. Thereinafter, all subscriber transmitted data are routed from the serving BSS to the home MSC. The application module within the home MSC then processes the data to provide mobile service to the mobile station.

29 Claims, 10 Drawing Sheets

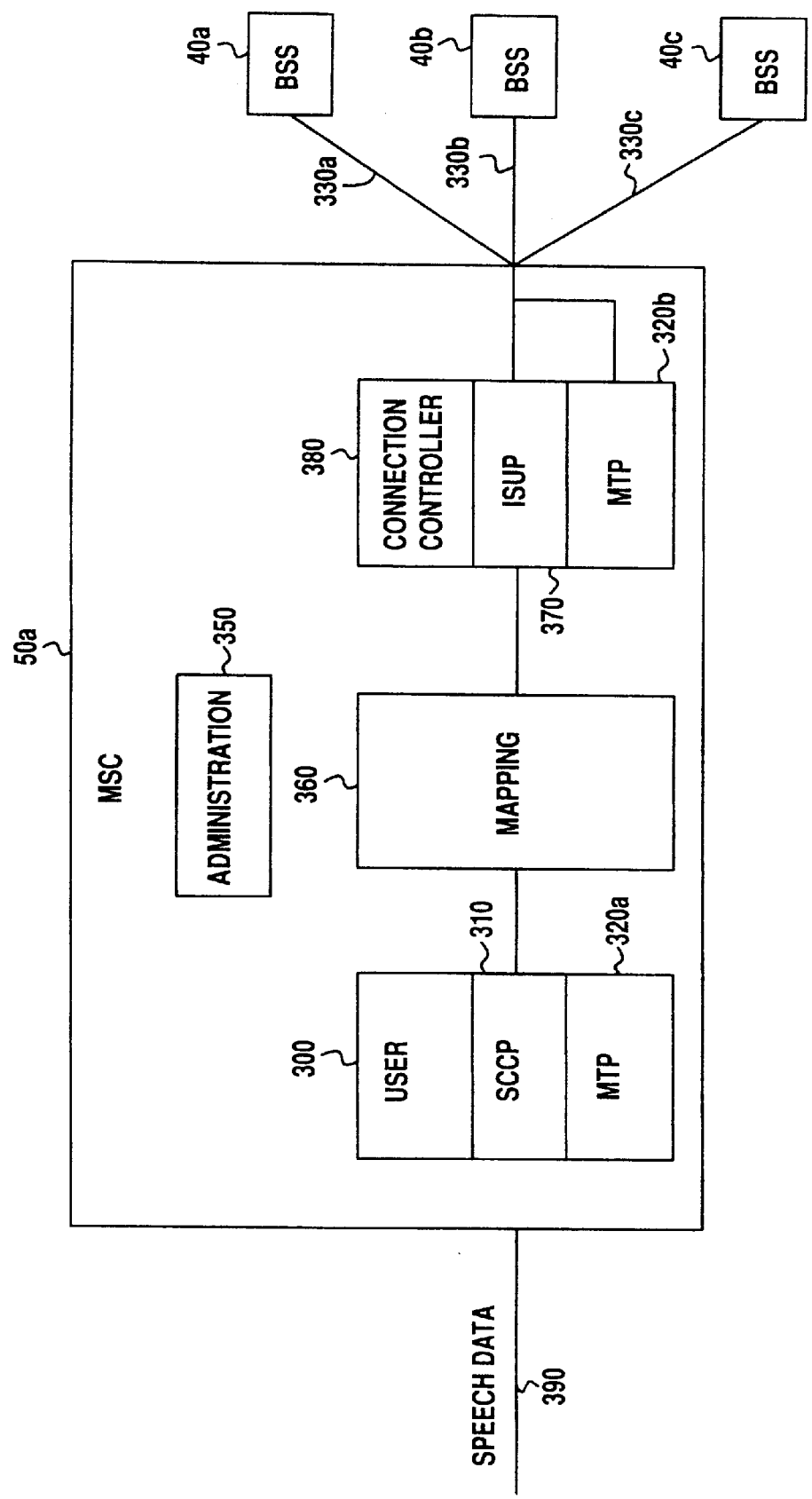

DYNAMICALLY CREATED A-INTERFACE WITHIN A MOBILE NETWORK

BACKGROUND OF THE INVENTION

1. Technical Field of the Invention

The present invention relates to a telecommunications system and, in particular, to the establishment of an A-interface within a mobile telecommunications network.

2. Description of Related Art

With the development of Public Land Mobile Network (PLMN) telecommunications systems, mobile subscribers are able to freely travel within a particular country and utilize their mobile services Even if the mobile subscriber is roaming within a visited PLMN, the home PLMN associated with the roaming mobile subscriber keeps track of the current location of the mobile subscriber and accordingly makes the necessary arrangements and signaling communications to enable the mobile subscriber to receive and originate calls via another PLMN.

With the globalization of telecommunications networks and related human activities, more advanced mobile communications systems geographically encompassing the whole world are being developed. Such a system enables a mobile subscriber to roam not only within a particular continent or country, but throughout the world. One such system is the Personal Communications System (PCS). Another such system is a satellite based mobile communications system providing global coverage via satellite communications.

For both systems, a number of mobile switching centers (MSC) are strategically placed throughout the world to provide mobile service to a mobile subscriber anywhere in the world. Each MSC is, in turn, associated with one or more base station subsystems (BSS) for providing a radio connection with a mobile station traveling within the MSC coverage area. Once a BSS providing coverage for a particular geographic area detects or receives data from a mobile station, the data is automatically forwarded to the connected MSC. Applications within the MSC then analyze the received data and accordingly route the data to its intended destination. As a result of this application layer processing, a communications link known as an "A-interface" is effectuated between the serving BSS and its associated MSC. The A-interface in effect provides physical connection between a BSS and its assigned MSC and dictates that the serving BSS communicate with only one particular MSC. The connected MSC then identifies the received data from the BSS and processes the data to provide mobile service to the roaming mobile station.

Statistically, even when a mobile subscriber is traveling within a foreign country or continent, the majority of the call connections are made to or received from a single geographic location. For example, even when an American mobile subscriber travels to Europe, it has been shown that the majority of calls are made to or received from the United States. However, because the serving BSS is able to only communicate with its associated European MSC, whenever the mobile station roaming within Europe transmits data to the serving BSS, applications within the connected European MSC receives the data, identifies the received data by utilizing the subscriber information copied from the home location register (HLR) associated with the mobile station, and reroutes the data to the American PSTN upon determining that the calls are destined for America. However, such an implementation requires the applications within the visited MSC to always communicate with the HLR associated with the mobile station to retrieve the requisite subscriber information, to perform location update with that HLR, and to always identity and process the data, i.e., calls, even though the majority of calls are destined towards a different PSTN. It may further result in unoptimized use of speech circuits within the connecting telecommunications networks.

Accordingly, it would be advantageous for the European BSS to instead communicate all received data directly with the American MSC associated with the roaming mobile station. As a result, there is a need for a mechanism to break the A-interface that exists, for example, between the European BSS and the application modules within the European MSC, and to enable the European BSS to dynamically establish an A-interface connection with application modules of any other MSC associated with a particular mobile station.

SUMMARY OF THE INVENTION

The present invention discloses a method and apparatus for facilitating optimal communication between a base station subsystem (BSS) serving a roaming mobile subscriber and a home mobile switching center (MSC) associated with that mobile subscriber. All calls communicated by the roaming mobile subscriber are automatically forwarded by the serving BSS to the home MSC regardless of the final destination. In one embodiment, in order to enable the serving BSS to forward all data, e.g., calls, to the home MSC, the roaming mobile subscriber transmits the address representing the home MSC to the serving BSS during initial registration and other procedures. In another embodiment, the roaming mobile subscriber transmits the assigned International Mobile Subscriber Identity (IMSI) number to the serving BSS. Utilizing the received home MSC address or the IMSI number, the serving BSS identifies the home MSC and, thereinafter, routes all data to the home MSC directly.

In one embodiment, the address representing the home MSC is stored within a Subscriber Identity Module (SIM) card associated with the mobile station.

In another embodiment, the address representing the home MSC is stored within an internal memory register associated with the mobile station.

In yet another embodiment, the A-interface for communicating data transmitted by the serving BSS towards the home MSC is accomplished via a dedicated Multiplexed coded (MCD) E-1 link between the visited MSC and the home MSC.

In yet another embodiment, the A-interface for communicating data between the serving BSS and the home MSC is established through conventional Signaling System No. 7 (SS7) telecommunications networks.

BRIEF DESCRIPTION OF THE DRAWINGS

A more complete understanding of the method and apparatus of the present invention may be had by reference to the following detailed description when taken in conjunction with the accompanying drawings wherein:

FIG. 10 is a block diagram of a home MSC maintaining data for mapping each user with its corresponding A-interface link.

DETAILED DESCRIPTION OF THE DRAWINGS

Figure 1:
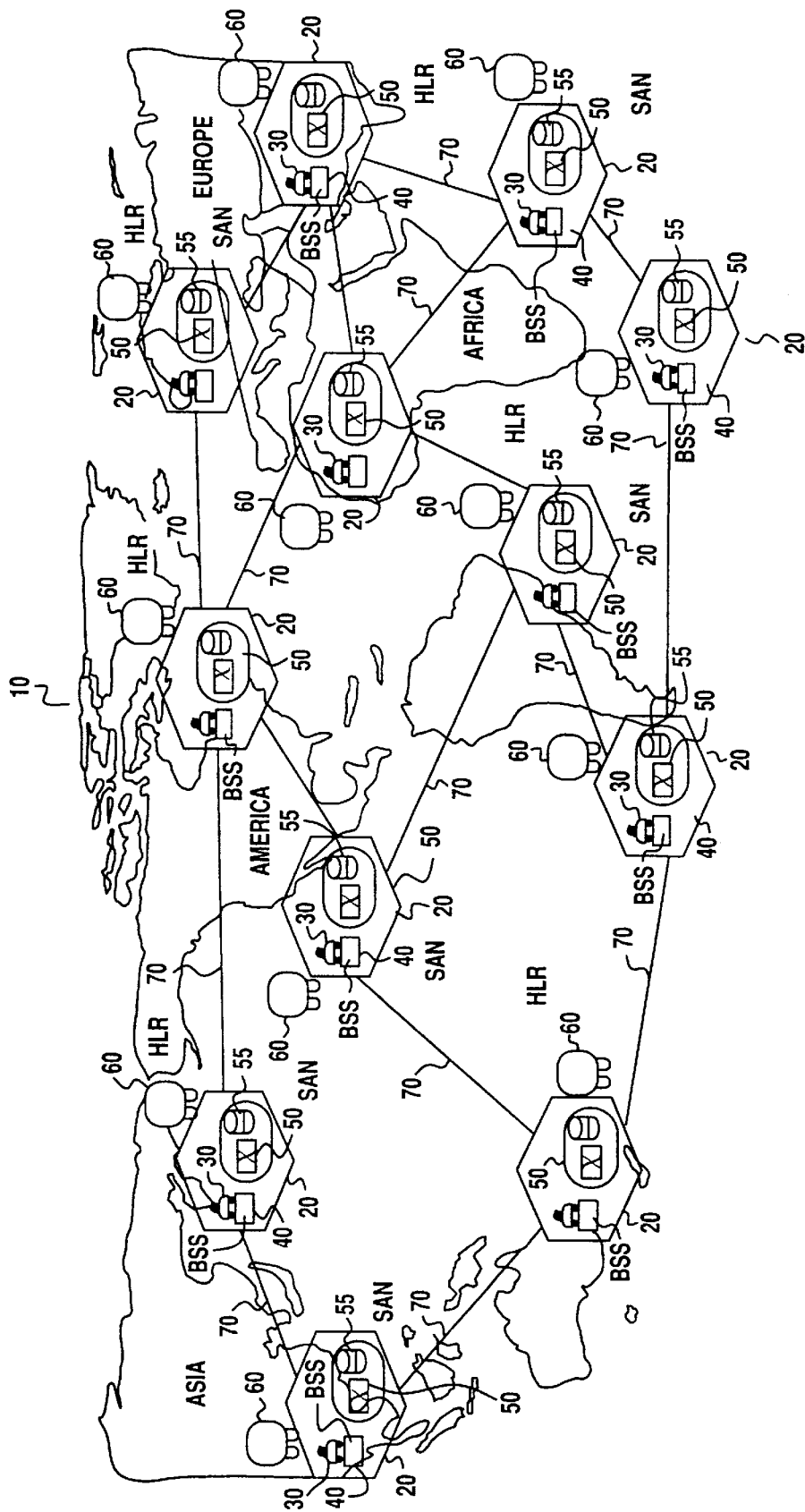
FIG. 1 is a block diagram of a satellite based mobile communications network providing world-wide mobile service.

FIG. 1 is a block diagram of a satellite based mobile communications network 10 providing world-wide mobile service. The satellite based mobile communications network 10, such as the one provided by ICO Global Communications (ICO), is comprised of a number of Satellite Access Nodes (SANs) 20 which are strategically placed throughout the world to provide optimum global coverage. Each SAN 20 is further comprised of a land earth station (LES) 30, a base station subsystem (BSS) 40, and a mobile switching center (MSC) 50. As an alterative, the BSS 40 may contain or be connected to the LES 30. Each MSC 50 is also usually coupled to a visitor location register (VLR, hereinafter collectively referred to as a MSC/VLR 50) 55. In order to store and maintain subscriber data for its servicing subscribers, each SAN 20 is further associated with a centralized database called a home location register (HLR) 60. As an illustration, FIG. 1 shows twelve SANs 20 geographically dispersed at strategic locations throughout the world. One or more SANs 20 on each continent are used to provide global mobile service to mobile subscribers. In order to facilitate communications between the twelve SANs 20, each SAN 20 is also connected to each of at least two neighboring SANs via a communications link 70.

Whenever a mobile station associated with a first Public Land Mobile Network (PLMN) travels into a coverage area served by a particular mobile switching center (MSC), the serving MSC performs a location update with the home location register (HLR) associated with the mobile station and located within the first PLMN. As an illustration, whenever a North American mobile station roams into a coverage area serviced by a European MSC, the European MSC performs a location update with a home location register (HLR) associated with the roaming mobile station. By performing a location update, the visited MSC informs the HLR of the roaming mobile station's new location and further retrieves subscriber information related to the mobile station. Such information includes billing data, Mobile Subscriber Integrated Service Digital Network (MSISDN) number, and application feature data. Thereinafter, the European MSC provides mobile service to the roaming mobile station and enables the mobile station to originate outgoing and terminate incoming calls.

Figure 2:
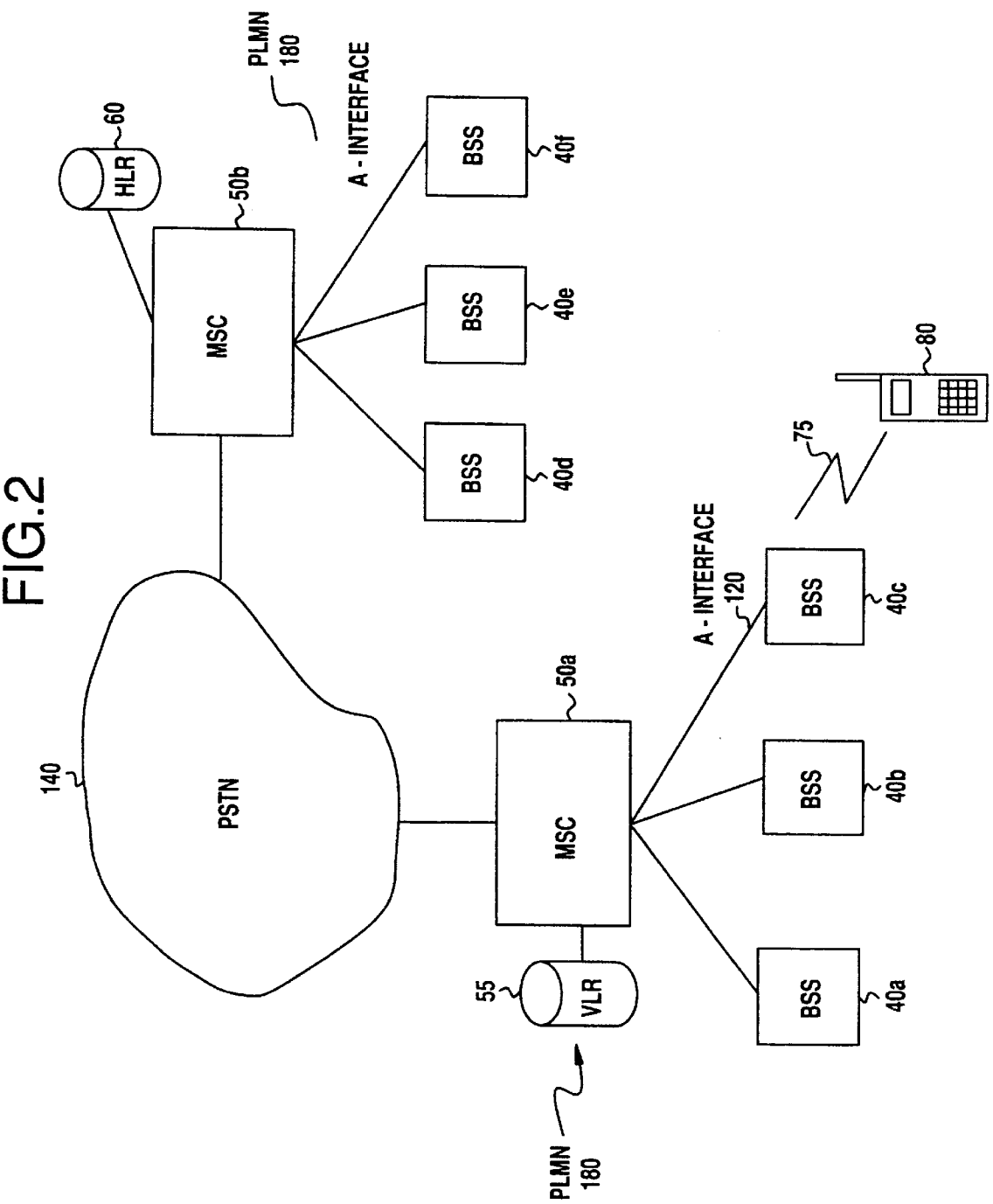
FIG. 2 is a block diagram of a communications system including a mobile switching center (MSC) connected to a number of base station subsystems (BSS) within a Public Land Mobile Network (PLMN)

FIG. 2 is a block diagram of a mobile switching center (MSC) 50a connected to a number of base station subsystems (BSS) 40a within a Public Land Mobile Network (PLMN) 180. Within a mobile telecommunications network, such as the Personal Communications System (PCS), each MSC 50a connected to one or more BSSs 40a–40c. Each BSS is, in the responsible for providing radio coverage to mobile station within a particular geographic area. Therefore, the communications between a mobile station 80 traveling with a particular MSC coverage area and the serving MSC 50a provided by a radio connection 75 between the mobile station 80 and one of the BSSs 40, such as a BSS 40c, connected to serving MSC 50a. Since the BSS 40c is physically connected to the serving MSC 50a, whenever the BSS 40c receives data from the mobile station 80, the BSS 40c has the option but to forward the received data to the serving MSC 50a. The MSC 50a then determines the identity of the mobile station transmitting the data, the destination address of the received data, and accordingly processes the data. The physical connection between an MSC and its associated BSS is called an "A-interface" 120.

In order to properly process and identify the data transmitted by the mobile station 80, the serving MSC 50a must retrieve the requisite subscriber data from the HLR 60 associated with the roaming mobile station 80. The HLR 60 is a centralized database storing all relevant subscriber related information including the current location of the mobile station 80 and the identity of the MSC currently serving the mobile station 80. Accordingly, whenever a particular MSC detects the presence of the mobile station 80 within its coverage area, in a manner similar to the satellite system described above, the visited MSC 50a performs a location update with the HLR 60. The location update is performed to inform the HLR 60 of the mobile station's current location and to retrieve the requisite subscriber information from the HLR. As described above, such retrieved data, including the MSISDN number and billing data, are stored at another centralized database (e.g., visitor location register) associated with the serving MSC 50a and later utilized by the serving MSC 50a to provide mobile service to the roaming mobile station 80. Thereinafter, all calls made from the roaming mobile station 80 are processed by the visited MSC 50a, and calls to the mobile stations are also routed normally through the network towards the visited MSC 50a.

Regardless of whether the relevant system is a satellite system or a PCS system, the A-interface link for connecting a particular BSS with its associated MSC acts as a physical limitation to system operation. Accordingly, each BSS has no option but to always forward all received data to one particular MSC. An application module within the connected MSC 50a then receives the data transmitted by the roaming mobile station 80 and determines what to do with the received data. However, there are situations where it would be advantageous for the serving BSS 40c to instead establish an A-interface with an application module within a different MSC 50b located remotely from the serving BSS 40c. Instead of being limited by the physical constraints existing between the connected MSC 50a and the BSS 40c, depending on the identity of the serving mobile station, there are situations where it would be advantageous for the serving BSS 40c to instead establish an A-interface via a dynamically established communications link to a different MSC 50b.

In cases where a mobile subscriber from a first PLMN is traveling within a second PLMN, it has been shown that the majority of all incoming and outgoing calls are made to or received from other telecommunications subscribers in the first PLMN, or more particularly, his or her home PLMN. Therefore, whenever the BSS 40c in Europe receives subscriber data from the mobile station 80 associated with the North American MSC 50b, chances are that the majority of those received data are intended for a node or terminal in North America. It would be economical and efficient then for the receiving BSS 40c to always forward all received data, including coded voice, to the MSC 50b located in North America instead of to the connected MSC 50a located in Europe. By transferring the received data transparently through the European MSC 50a, no subscriber data have to be copied from the North American home location register 60 to the visitor location register 55 associated with the European MSC 50a. By this, it is meant that the European MSC 50a merely acts as a conduit signal transfer point (STP) and no application module within the European MSC 50a receives or processes the received data. For example, the established voice circuit is transited through the European MSC. The European MSC 50a only acts as a transfer point and routes the received data to a particular MSC specified by the connected BSS.

By always forwarding data to the home MSC 50b associated with the roaming mobile station 80, the same call control and service, including subscriber features and charging, can be maintained and provided by the home MSC 50b regardless of which BSS 40a–40f is currently serving the mobile station 80. Furthermore, more economical and efficient data (i.e., voice) communications can be achieved between the serving BSS 40c and the home MSC 50b.

In order for the serving BSS 40c to automatically forward all received data to the home MSC 50b, two implementations have to be made to the existing mobile telecommunications system: first, the physical limitation imposed by the conventional A-interface has to be removed; and second, the serving BSS must be able to identity the home MSC associated with each mobile station traveling within its coverage area to dynamically establish an A-interface with the identified MSC.

Figure 3:
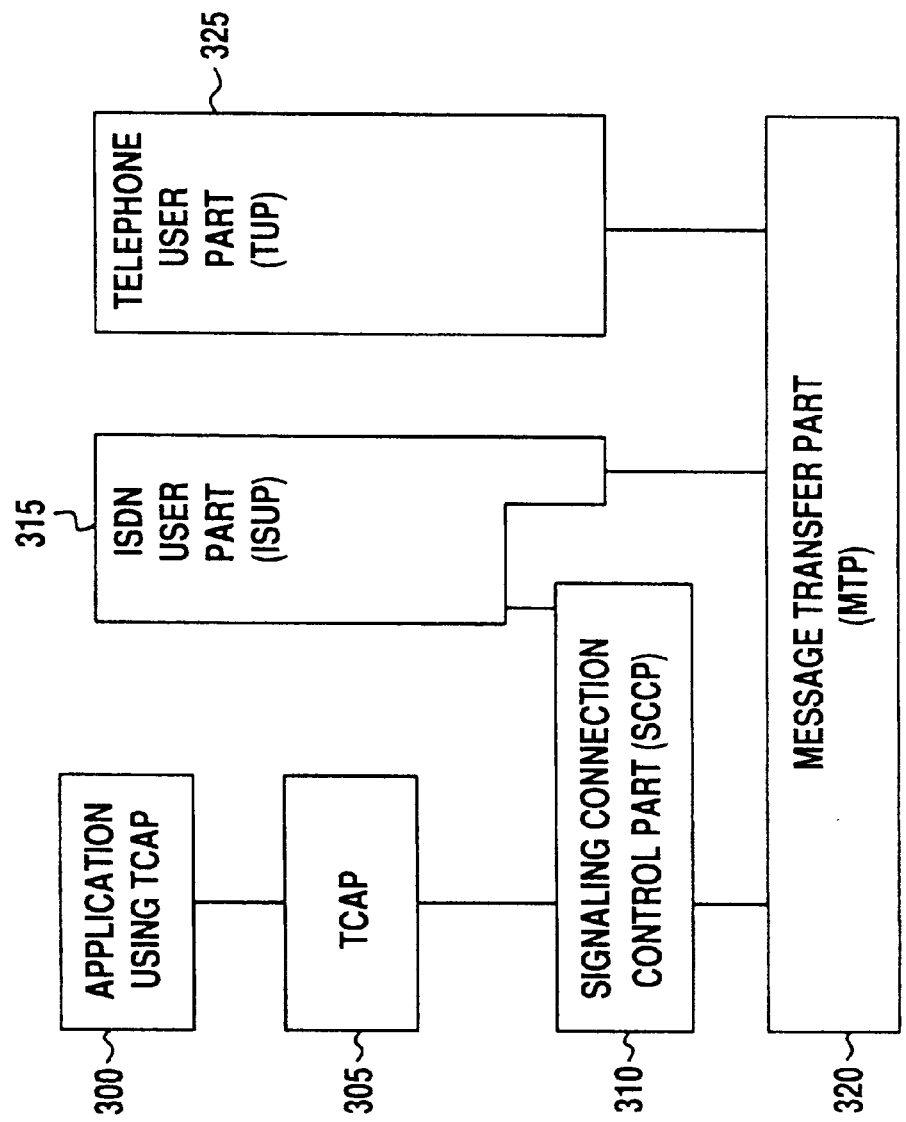
FIG. 3 is a block diagram of a Common Channel Signaling (CCS) Signaling System No. 7 (SS7) telecommunications protocol for communicating signals and data between two end users.

FIG. 3 is a block diagram of a Common Channel Signaling (CCS) Signaling System No. 7 (SS7) telecommunications protocol for communicating signals and data between two end users. The CCS SS7 telecommunications system, designed using the concepts of packet switching and tailored to conform to the Open System Interface (OSI) model, has been developed for use with both national and international traffic, for local and long-distance networks, for interexchange signaling, and for various types of channels, including both terrestrial and satellite channels. Furthermore, the introduction of a packet-switched network used to carry call-signaling messages makes other data-handling services possible as well. These services include the simultaneous transmission of various types of traffic, data, voice and video, among others. They make available the possibility of special types of call services such as "800" call features and services, call forwarding, calling party identification and other database administrations.

As shown in FIG. 3, SS7 basically has two parts, a user part and a message transfer part (MTP) 320. The user part comes in several varieties, each one corresponding to higher-layer protocols that enable user functions, possibly on dissimilar machines, to communicate with one another. Examples of such user parts include a Telephone User Part (TUP) 325 for basic telephone service, and an Integrated Service Digital Network (ISDN) User Part (ISUP) 315 for providing combined voice, data and video services. These user parts make use of the network delivery services provided by the Message Transfer Part (MTP) 320 which provides a connection-less but sequenced transport service. An user module residing within the application layer 300 communicates with other user modules by interfacing connection-less signals, such as a Direct Transfer Application Part (DTAP) based signal, with the Signal Connection Control Point (SCCP) 310 layer. The SCCP layer determines the destination address associated with the receiving end user and transports the data via interfacing with the physical MTP layer 320. The application layer 300 may also interface with the Transaction Capability Application Part (TCAP) layer 305 to indirectly communicate with the SCCP layer. TCAP messages communicated by the TCAP layer 305 enable application modules, such as subscriber feature application modules, to provide special subscriber features to telecommunications subscribers. Such subscriber features include Automatic Callback, "800" service, and Automatic Recall.

Figure 4:
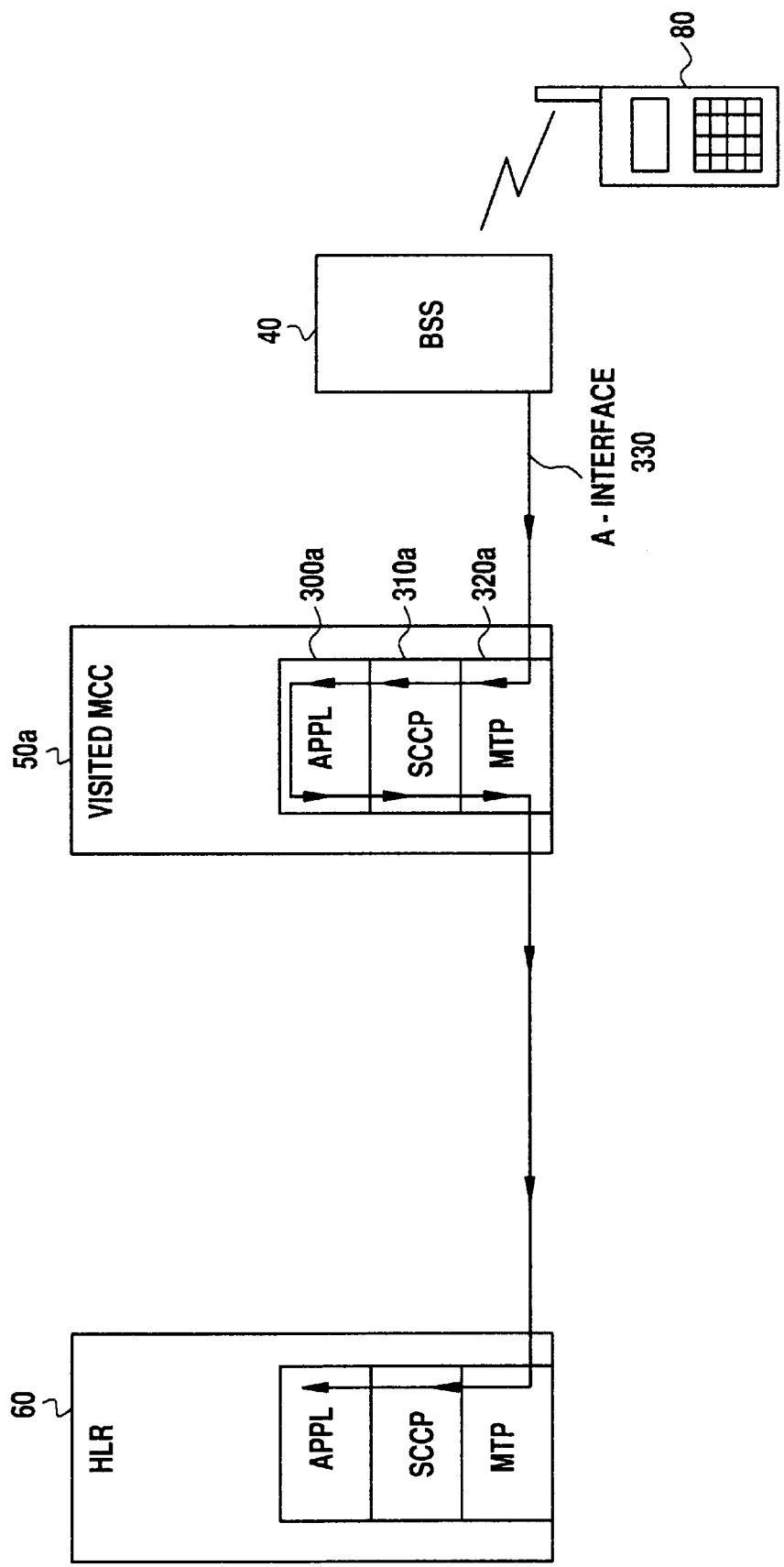
FIG. 4 is a block diagram of a visited MSC functioning as a serving MSC to provide mobile service to a roaming mobile station.

FIG. 4 is a block diagram of a visited MSC 50a functioning as a serving MSC in a conventional manner to provide mobile service to the mobile station 80. All software and hardware modules and devices included within a particular telecommunications exchange or switch are organized and structured in accordance with the CCS SS7 standard. As an illustration, the physical wire or connection for connecting the MSC 50a with the BSS 40 constitutes the MTP layer 320. Software and hardware modules for receiving the data communicated over the MTP layer to identify the destination address constitute the SCCP layer 310. If the received data are intended for one of its own application modules, the SCCP layer extracts the encapsulated data from the received connection-less packet signal and forwards the extracted data to the appropriate application module residing within the application layer 300. Otherwise, the SCCP layer 310 analyzes the destination address and re-transmits the signal over the MTP layer link. As described above, conventionally, all data received by the serving BSS 40 from the mobile station 80 are automatically forwarded to the connected MSC 50a. The SCCP layer 310a within the visited MSC 50a receives the data from its MTP layer 320a and, after determining that the received data are intended for itself, forwards the data to the application layer 300a. An application module within the application layer 300a then identifies and processes the received data to provide appropriate mobile service to the mobile station 80. Such a process may include performing a location update with the HLR 60 associated with the mobile station 80. Another process may be to retrieve the requisite subscriber information from the associated HLR 60. Accordingly, all BSS forwarded data are received and filtered by the application layer 300a before being processed or transmitted to another node, e.g., HLR or home MSC, within the telecommunications network. Therefore, the A-interface connection 330 exists only between the visited MSC 50a and the connected BSS 40.

Figure 5:
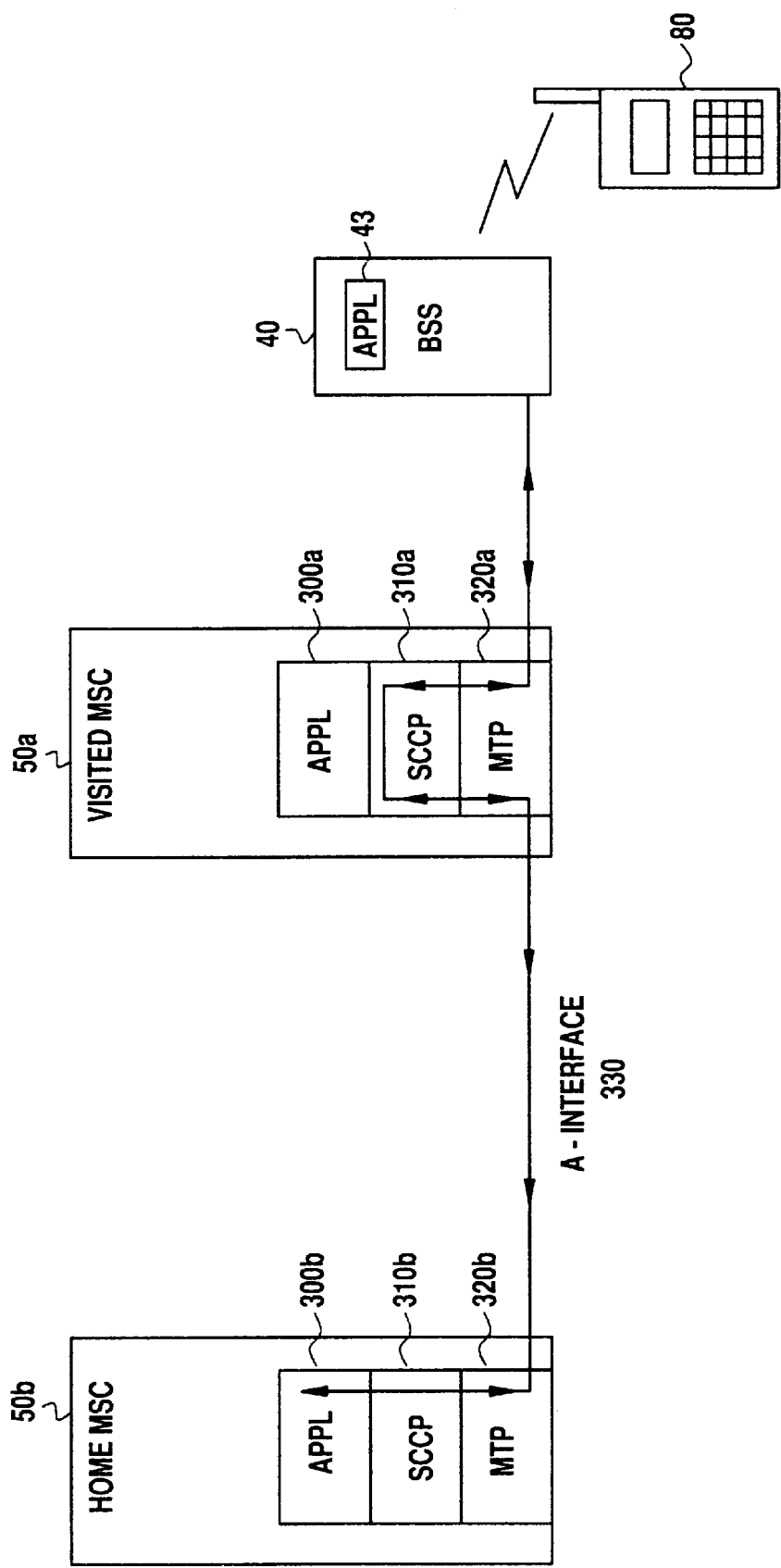
FIG. 5 is a block diagram of a visited MSC functioning as a conduit Signal Transfer Point (STP)

FIG. 5 is a block diagram of the visited MSC 50a functioning as a conduit Signal Transfer Point (STP) in order to break the physical limitation imposed by the conventional A-interface connection between a particular BSS 40 and its physically connected MSC 50a. Instead of automatically transmitting the received data to the visited MSC 50a, the data received from the mobile station 80 are transmitted from the serving BSS 40 to the home MSC 50b associated with the mobile station 80 transparently through the visited MSC 50a.

The serving BSS 40 encapsulates the mobile station transmitted data into an SCCP based signal and specifies the network address representing the home MSC 50b as the destination address. Since the serving BSS 40 is still physically connected to the visited MSC 50a, the transmitted SCCP signal is transported to the MTP layer 320a of the visited MSC 50a. The MTP layer 320a then forwards the received signal to the SCCP layer 310a. The SCCP layer 310a then analyzes the destination address of the received packet and determines that the packet is not intended for one of its own application modules. As a result, the received packet is transparently routed through the visited MSC 50a. The SCCP signal is then transported by the connected SS7 network to the home MSC 50b as specified by the destination address included in the SCCP signal. The MTP layer 320b of the home MSC 50b receives the data and forwards them to the interfaced SCCP layer 310b. The SCCP layer 310b, after determining that the signal has reached its final destination, extracts the encapsulated data and forwards the extracted data to the application layer 300b. An application module within the application layer 300b then processes the data to provide appropriate mobile service to the mobile station roaming within another PLMN.

In accordance with the teachings of the present invention, by enabling the serving BSS to specify a network address representing a different MSC than the serving MSC physically connected to the serving BSS, the visited MSC 50a merely acts as a conduit Signal Transfer Point (STP) and the BSS transmitted data are instead forwarded by the visited MSC to a destination MSC specified by the serving BSS. Accordingly, even though the visited MSC 50a is physically connected to the serving BSS 40, it is the remotely connected home MSC 50b which processes the data and controls the call. Therefore, a dynamically established A-interface 330 between the home MSC 50b and the serving BSS 40 is created.

Accordingly, in order to enable the serving BSS 50 to communicate all data received from the mobile station 80 with the home MSC 50b, the serving BSS 50 must be able to identity the home MSC 50b associated with the roaming mobile station 80 without the help of the visited MSC 50a. Therefore, an application module 43 within the visited BSS 40 receives an identification number from the mobile station 80 and determines the network address representing the home MSC 50b associated with the mobile station 80. In accordance with the teachings of the present invention, there are a number of different identification numbers that can be used to identity the home MSC 50b. One such number is the International Mobile Subscriber Identity (IMSI) number associated with the mobile station. Another such number is the network address representing the home MSC.

Figure 6:
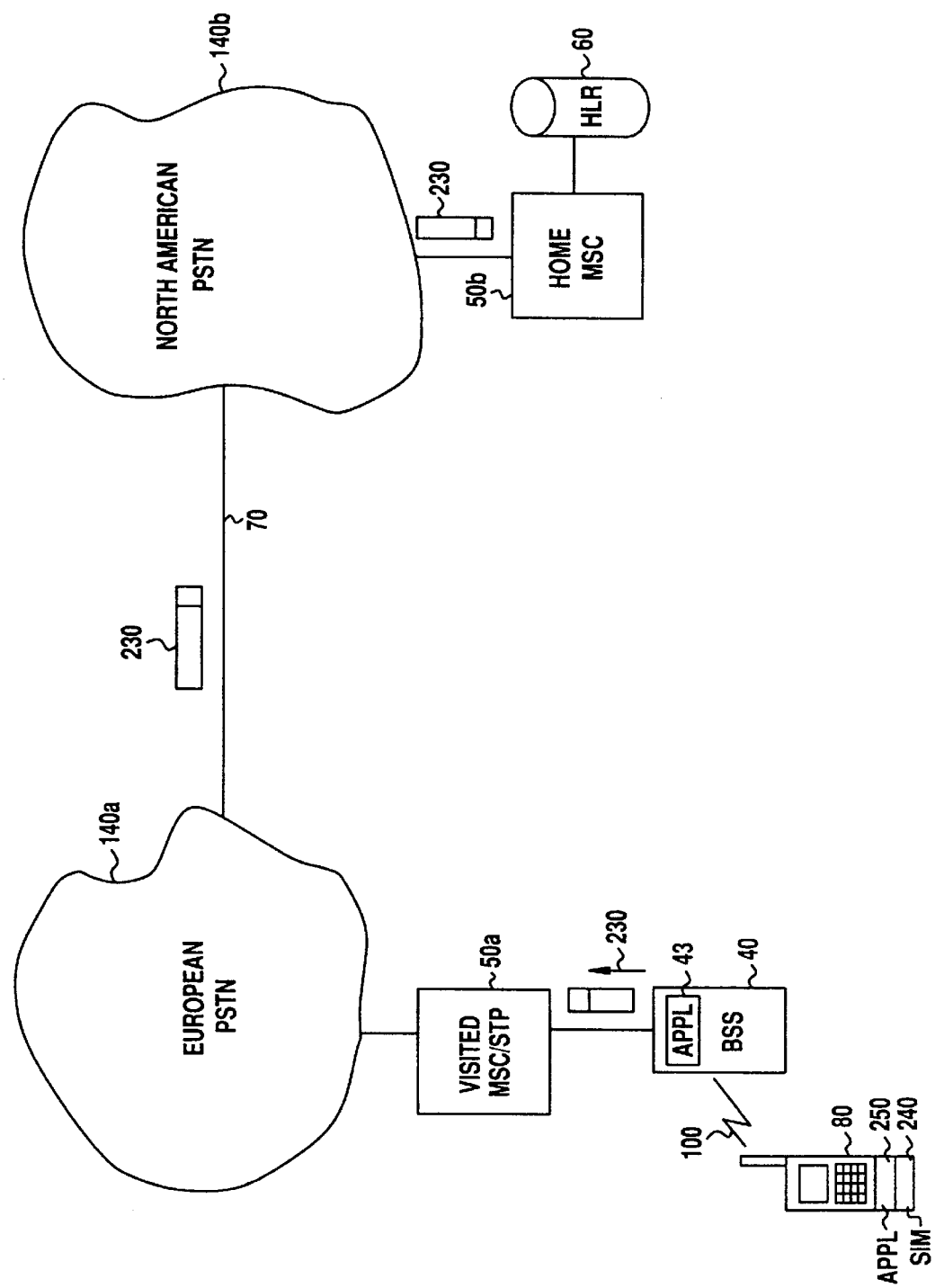
FIG. 6 is a block diagram of a telecommunications system illustrating a serving base station subsystem (BSS) transmitting a location update signal using a home mobile switching center (MSC) address received from the mobile station.

FIG. 6 is a block diagram illustrating a serving BSS, such as the European based BSS 40, transmitting a location update signal 230 using a home MSC address received from the mobile station 80. Whenever the mobile station 80 turns on its unit for the first time or travels into the coverage area provided by the European BSS 40, the mobile station 80 identifies itself and registers with the home MSC 50b by transmitting its identification number such as an International Mobile Subscriber Identity (IMSI) number to the serving BSS 40. During the registration, an application module 250 associated with the mobile station 80 retrieves the network address identifying the home MSC 50b from the attached Subscriber Identity Module (SIM) card 240 and further transmits the retrieved network address over the radio link 100. The home MSC address may comprise an SS7 global title (GT) address or a point code (PC) address representing the home MSC that is routeable over the existing PSTN. The application module 43 within the European BSS 40, upon realizing that this particular mobile station 80 wishes to communicate all data through the MSC specified by the received data, transmits a location update signal informing the home MSC 50b of the mobile station's current location and to identify itself as the serving BSS. A Signaling Control Connection Part (SCCP) based signal 230 over an Signaling System No. 7 (SS7) network is transmitted from the European BSS 40 to the North American MSC 50b. The SCCP based signal 230 containing the North American MSC address as the destination address is routed through the conventional PSTNs and communicated from the European PSTN 140a to the North American PSTN 140b over the international trunk link 70. Once the connection-less SCCP based signal 230 is received by the North American PSTN 140b, it is properly forwarded to the specified MSC 50b. The forwarded signal 230 further includes the international mobile subscriber identity (IMSI) number assigned to the mobile subscriber. As a result, the North American MSC 50b is notified of the mobile station's new location and the identity of the new BSS 40 currently serving the mobile station 80. Application modules within the North American MSC 50b further updates the HLR 60 to indicate that the North American MSC 50b is serving the mobile station 80. As a result, a dynamically established A-interface signaling link between the serving BSS 40 and the home MSC 50b is created.

Since the home MSC address is independently stored within the mobile station 80, in case the majority of calls are being directed to a different continent or MSC coverage area, the mobile subscriber may freely update the memory register to store the new address representing the new home PLMN. Furthermore, the memory register can be changed to reflect the network address of the last MSC used by the mobile station. Thereinafter, all subsequent calls are processed through the newly designated MSC. As a result, the mobile subscriber may have one MSC as the home MSC and another MSC as the "control" MSC where all calls are processed. This is possible because the mobile station transmits two different numbers when initially registering with the serving BSS. A first number, such as an IMSI number, uniquely identifies the mobile subscriber and a second number, such as an MSC network address, uniquely identifies the home or "control" MSC.

As an alternative, the existing IMSI number transmitted by the mobile station 80 during initial registration can be used by the serving BSS 40 to communicate a SCCP based signal with the home MSC 50b. Since a series of IMSI numbers are assigned to a particular MSC or HLR, by analyzing the received IMSI number, the serving BSS 40 and the connected PSTNs 140a–140b are able to ascertain the identity of the home MSC 50b. Accordingly, after receiving the IMSI number from the newly registering mobile station 80, the serving BSS 40 transmits a SCCP based signal 230 over an SS7 network to the home MSC 50b. The SCCP based signal 230 containing the received IMSI number as the called party address is routed through the conventional PSTNs and communicated from the European PSTN 140a to the North American 140b over the international trunk line 70. As a result, the North American MSC 50b is notified of the mobile station's new location and the identity of the new BSS 40 currently serving the mobile station.

In case only the IMSI number is used, because a mobile subscriber is not able to independently change his or her IMSI number without changing his or her home MSC subscription, upon determining that the majority of calls are being terminated towards or received from an MSC area other than the home MSC, the mobile subscriber cannot reroute the data to the new MSC area while maintaining the same home MSC designation.

The MSC network address or the IMSI number is stored within the mobile station 80 and transmitted through an over-the-air signal, such as a Direct Transfer Application Part (DTAP) based signal, from the mobile station 80 to the serving BSS 40 during initial registration. The mobile station can retrieve the stored home MSC address and/or IMSI number from the associated Subscriber Identity Module (SIM) card 240, or directly from one of its internal registers. By having the home MSC address and/or IMSI number stored within the SIM card 240, the mobile subscriber may freely attach the SIM card 240 with any available mobile station 80 and utilize the above invention. Regardless of whether the home MSC address and/or IMSI number is stored in an SIM card 240 or a mobile station 80 itself, the application module 250 within the mobile station 80 retrieves the stored address and transmits it to the serving BSS 40 during initial registration.

Subsequently, whenever an incoming call is received by the North American MSC 50b intended for the mobile station 80, the MSC 50b pages the mobile station 80 through the European BSS 40 and forwards the call connection directly from the North American MSC 50 to the European BSS 40. As an illustration, a Direct Transfer Application Part (DTAP) based signal utilizing the network address representing the serving BSS 40 as the destination address is routed over the connecting SS7 telecommunications network. After the DTAP based signal is routed to the serving BSS 40, the serving BSS 40 extracts the IMSI number identifying the mobile station 80 from the received signal and performs the paging with the extracted IMSI number. The mobile station 80 monitoring the paging channel (PCH) responds to the paging identified by its IMSI number. Once the mobile station 80 responds to the paging, the BSS 40 notifies the MSC 50b and a speech channel connecting the incoming call with the mobile station 80 is accordingly established.

Figure 7:
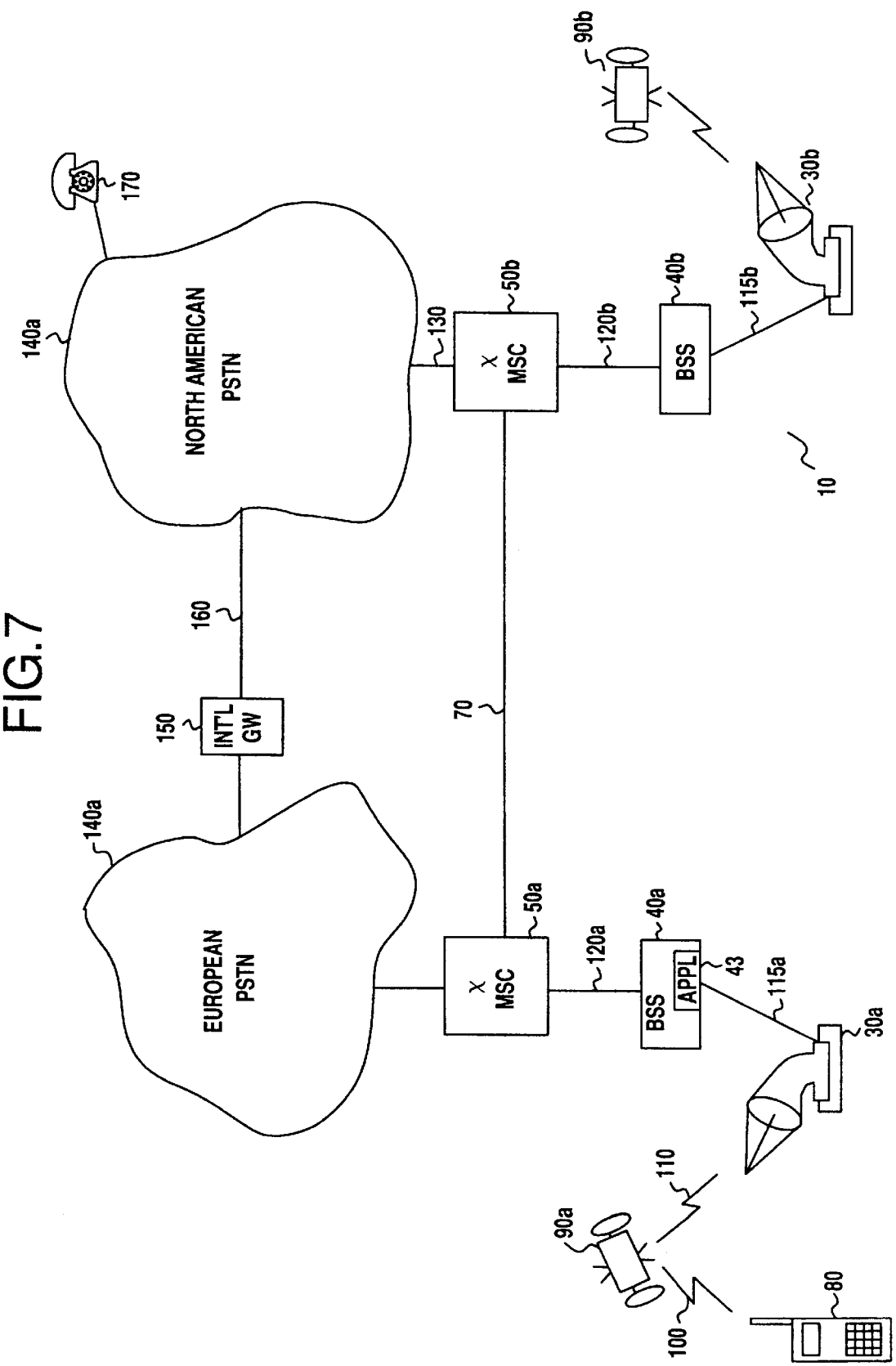
FIG. 7 is a block diagram of a satellite based mobile communications network maintaining a private signaling and communications link as well as connecting to a Public Switched Telephone Network (PSTN) and a Public Land Mobile Network (PLMN)

FIG. 7 is a block diagram of a Satellite based mobile communications network maintaining a private signaling and communications link as well as connecting to an existing PSTN or PLMN. A speech or data connection from mobile station 80 to another telecommunications terminal can be established via a number of different routes. A data signal from the mobile station 80 is initially detected and received by one of the satellites orbiting the earth atmosphere 90a via a first radio link 100. The received data are then downloaded to a land earth station (LES) 30a serving in the mobile station's current location via a second radio link 110. The downloaded subscriber data are then forwarded to an associated Base Station Subsystem (BSS) 40a via a communication link 115a. As an alternative, as described above, the LES 30a may also be part of the BSS 40a. From the serving BSS 40a, there are basically two different ways the received data can be communicated to a destination terminal or node, such as the home MSC 50b, on another continent. The serving BSS 40a can connect directly to the associated Public Switched Telephone Network (PSTN) 140a via the connected MSC 50a. The associated PSTN 140a can then route the data to the destination node via conventional PSTN links. As an illustration, if the serving BSS 40a and MSC 50a serve the European continent, the received subscriber data can be forwarded to the European PSTN 140a via a communications link 130.

The European PSTN 140a, such as an International Telecommunications Union (ITU) based Signaling System No. 7 (SS7) telecommunications network, then connects to an international gateway 150 and forwards the subscriber data to one of the PSTNs 140b covering the North American continent over an international trunk line 160. The North American PSTN 140b then routes the received data to the home MSC 50b. Accordingly, a dynamically established A-interface for connecting the serving BSS 40a with the home MSC 50b is established through the conventional SS7 telecommunications network. A corresponding speech circuit is also similarly established.

As an alternative, the mobile station transmitted data can also be routed by the serving BSS 40a using the privately maintained SAN network 70. By forwarding the received data to the European PSTN 140a in a manner described above, the SAN network provider must incur additional charges for utilizing the public telecommunications network. However, by forwarding the received data from the BSS 40a serving the European continent to the home MSC 50b located on the North American continent via the private communications line 70, such external costs can be avoided. Such private lines are either privately maintained or leased exclusively and already paid for by the SAN network provider. Accordingly, it is much more economical to route the data as much as possible within the privately maintained network before forwarding the data to a PSTN or PLMN. Once the MSC 50b serving the North American continent receives the data over the communications link 70, the data can be routed to the North American PSTN 140b to connect to conventional telecommunications terminals, or to the BSS 40b to connect to another satellite based mobile station located within the North American coverage area.

Figure 8:
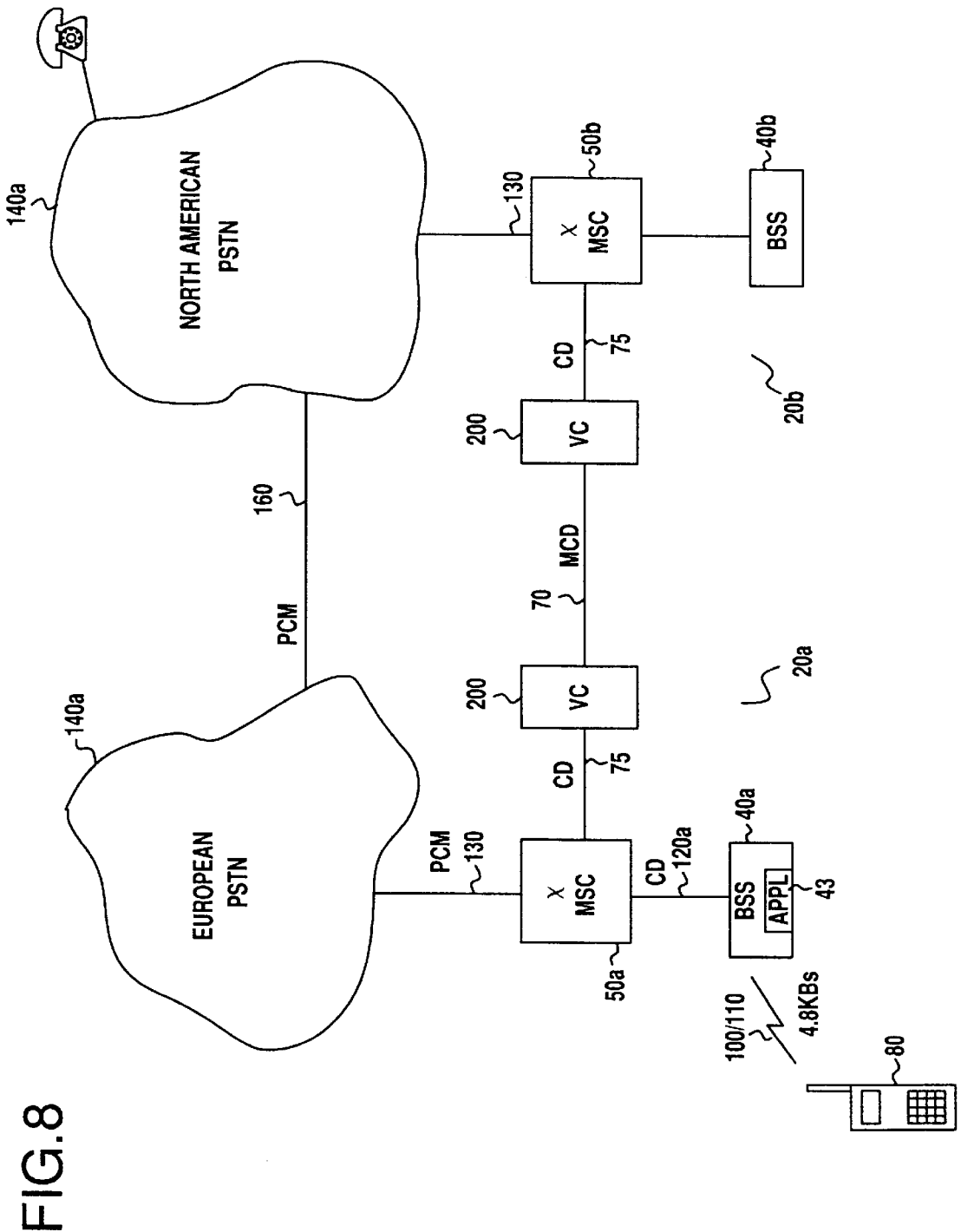
FIG. 8 is a block diagram of a satellite based mobile telecommunications network illustrating the different signaling protocols for interconnecting Satellite Access Nodes (SANs) and for connecting a SAN with a PSTN.

FIG. 8 is a block diagram illustrating the different signaling protocols utilized for connecting a first SAN 20a with a second SAN 20b and for connecting the first SAN 20a with a PSTN 140a. There are additional reasons for preferring to communicate over the privately maintained SAN network as much as possible before connecting to a PSTN. First, as described above, the privately maintained SAN network links are already accessible and paid for by the SAN network provider. Furthermore, it provides a direct communications link between the serving BSS and the home MSC. Moreover, the capacity for communicating data over the privately maintained SAN network 70 is much greater than communicating over conventional telecommunications networks.

In accordance with the Global System for Mobile (GSM) communications standard, the communications within and between PSTNs 140 are accomplished using 64 kilo-bits per second (Kb/s) Pulse Code Modulation (PCM) technology. PCM is a technique for transmitting a multiplexed voice or data stream over a T-1 or E-1 digital communications link 130. A PCM E-1 link includes up to thirty-two 64 Kb/s channels or paths. Out of the thirty-two channels, two are used for communicating control signals, and the remaining thirty channels are used for data communication. Each 64 Kb/s channel is required to carry a single call, and consequently, up to thirty calls can be communicated over the PCM E-1 link. On the other hand, the speech and data rate for each call communicated between the mobile station 80 and the BSS 40a via the air interface therebetween is 4.8 Kb/s. The 4.8 Kb/s data are then decoded into an 64 Kb/s data stream. Each 64 Kb/s data stream is in turn placed in a single 64 Kb/s channel and communicated from the BSS 40a to the serving MSC 50a over a coded (CD) communications link 120. Accordingly, while communicating with the PSTN 140, at most, only thirty simultaneous calls can be transmitted from the BSS to the PSTN via the thirty 64 Kb/s PCM E-1 communications link 130.

However, by communicating the received 8 Kb/s data stream over the private SAN network 70, the transmitting MSCs 50 no longer have to be dictated by the PCM requirements. Instead, a vocoder (VC) 200 connected to each MSC 50 receives multiple 8 Kb/s data streams over the CD communications link 75 and further multiplexes several 8 Kb/s data streams into one 64 Kb/s data channel or path. For example, using the vocoder 200, eight 8 Kb/s data rate calls can be multiplexed into a single 64 Kb/s PCM channel or path. As a result, instead of each 64 Kb/s channel carrying a single call, up to eight calls can be multiplexed and carried over a single PCM channel. Since the communications link 70 is a Multiplexed coded (MCD) E-1 link, there are thirty-two channels, out of which, thirty are speech channels. As a result, by utilizing the MCD technique, up to two hundred forty calls (8 times 30) can be communicated simultaneously over the MCD E-1 communications link 70. Once the multiplexed data are communicated over to the other side, another vocoder 200 connected to the receiving MSC 50b de-multiplexes the received data and communicates it to the receiving MSC 50b over the CD communications link 75.

As can be seen from the above illustration, establishing an A-interface between the serving BSS and the home MSC by communicating data over the MCD E-1 communications link 70 is considerably more economical and efficient than communicating over the PCM E-1 communications link 130.

Figure 9:
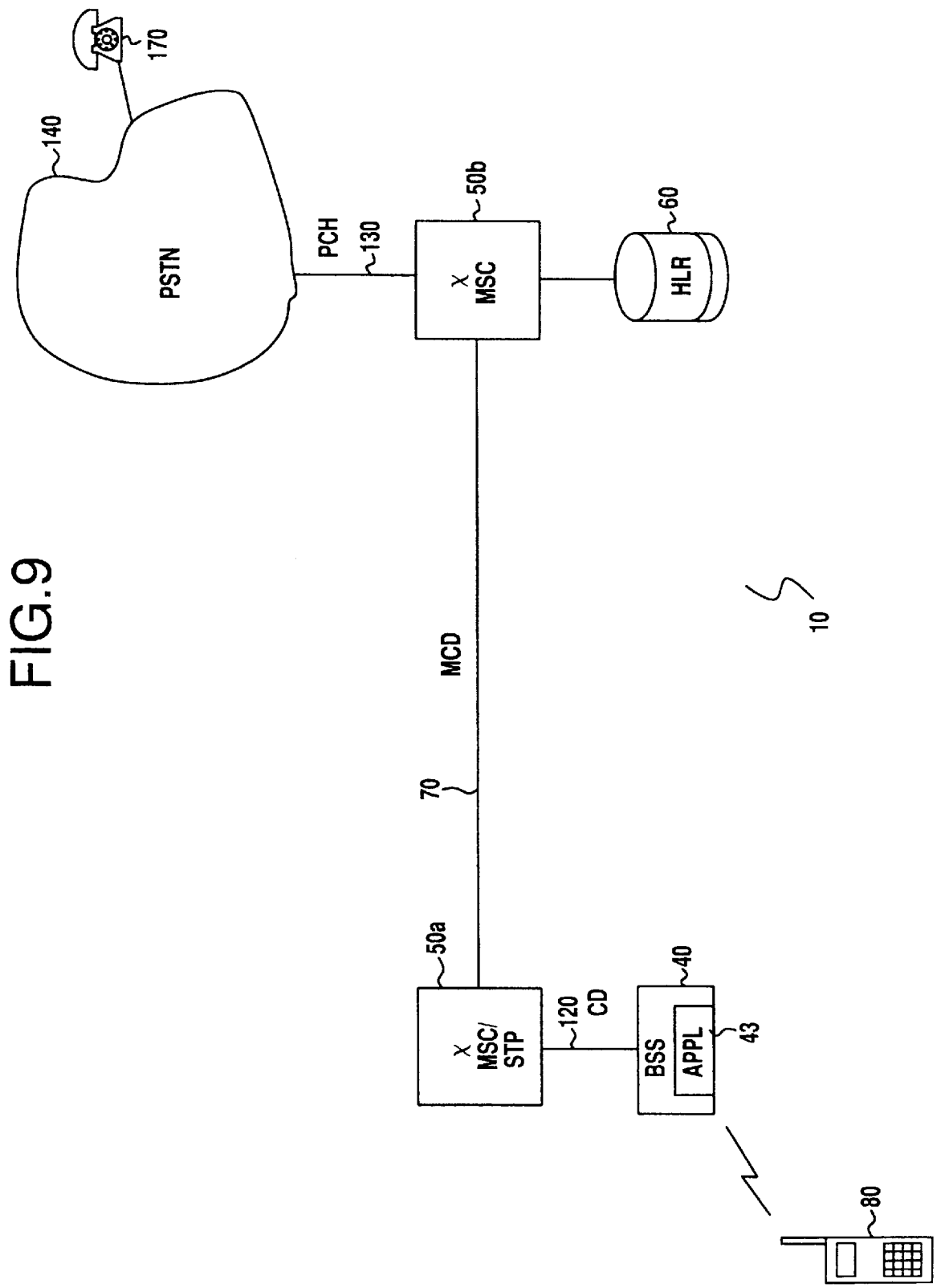
FIG. 9 is a block diagram of a satellite based mobile communications network illustrating terrestrial network optimization.

FIG. 9 is a block diagram illustrating the terrestrial network optimization within the satellite based mobile communications network 10. If the North American mobile station 80 is originating an outgoing call towards a subscriber terminal in North America while traveling within Europe, the European BSS 40 receives the transmitted data and forwards the data to the European MSC 50a via the CD communications link 120. As described previously, the European MSC 50a merely acts as an conduit signal transfer point (STP) and communicates the data from Europe to North America over the MCD E-1 communications link 70. Once the data are received by the North American MSC 50b, by utilizing subscriber information retrieved from the HLR 60, the serving MSC 40b establishes a call connection with a conventional wireline terminal 170 connected to the PSTN 140 via the PCM communications link 130.

Similarly, all data transmitted by the home MSC 50b towards the serving BSS 40 are also communicated over the MCD E-1 communications link 70. Once the serving BSS 40 receives the data, it is transmitted to the roaming mobile station 80 via a radio channel, such as a traffic channel (TCH).

FIG. 10 is a block diagram of a home MSC 50a maintaining data for mapping each user (e.g., application layer module for processing a call connection) with its corresponding A-interface link. In case one of the associated mobile subscribers is roaming within Europe and being serving by the BSS 40a, another mobile subscriber is roaming within North American and being served by the BSS 40b, and yet another one is roaming within Asia and being served by the BSS 40c, the home MSC 50 is no longer communicating data to a single BSS. Accordingly, depending on the call, the home MSC 50 has to determine which A-interface link 330a–330c should be used to communicate the data to the appropriate BSS 40a–40c.

When a target BSS or location is identified, conventionally, simply identifying the circuit which is permanently connected to the BSS associated with that location (e.g., the conventional "A-interface") enabled the serving MSC to communicate data to the target BSS. Since such dedicated circuits do not exist in the present invention, the association must now be to a route which leads to the establishment of an on-demand or dynamically created circuit to the needed target BSS or location. An administration module 350 within the home MSC 50a determines which association or mapping needs to be established in order to communicate speech data 390 received from a telecommunication user to one of the BSSs 40a–40b. After identifying the appropriate target, a corresponding user module 300 determines the destination network address. Utilizing the determined destination network address as the called party address in a call setup signal, such as an Initial Address Message (IAM), the call setup signal is forwarded to the connected SCCP module 310 and to the MTP module 320a. The transmitted IAM signal is then correlated with the appropriate outgoing call connection controller 380 by the mapping module 360. The connection controller 380 then forwards the call setup signal to the connected ISUP module 370 and to the appropriate MTP module 320b. The transmitted data are then treated by intermediate network nodes between the home MSC and the target BSS as normal call related data and lead to routing of the call to the serving MSC connected to the target BSS or location. The serving MSC recognizes from the delivered IAM data that this is a call directed towards a particular BSS circuit and establishes the physical connection accordingly. As a result, a dynamically established communications link (A-interface) between the home MSC 50a and a particular BSS 40 is established.

Since it has been shown that the majority of calls made from the mobile station are destined for subscribers in his or her home PLMN, it is more economical and efficient for the serving BSS to dynamically establish an A-interface with the home MSC and communicate all data received from the mobile station directly to the home MSC. The home MSC then routes the data, i.e., calls, to their destination nodes. If one of the received calls is not destined for the home PSTN or PLMN, the home MSC forwards the incorrectly delivered call to the connected home PSTN and routes the call to the correct destination. Costs and inefficiency of rerouting such incorrectly delivered calls should be compensated for by the majority of the calls which are delivered correctly by the serving BSS to the home MSC.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for delivering data from a mobile station to a destination telecommunications terminal within a telecommunications network, said mobile station being served by a first base station subsystem (BSS) and a first mobile switching center (MSC) and said mobile station being associated with a second MSC as a home MSC, said method comprising the steps of:

receiving data transmitted by said mobile station at said first BSS;

routing said received data from said first BSS to an application module within said second MSC transparently through said first MSC;

recognizing said data at said application module within said second MSC;

routing said data from said second MSC to said destination telecommunications terminal by establishing a call connection from said second MSC to said destination telecommunications terminal.

2. The method of claim 1 further comprising the step of dynamically establishing an A-interface between said first BSS and said application module within said second MSC transparently through said first MSC.

3. The method of claim 2 further comprising the initial step of said mobile station communicating with said second MSC, said step of communicating comprising the steps of:

transmitting an address representing said second MSC from said mobile station to said first BSS;

sending a signal indicating said mobile station's current location from said first BSS to said second MSC; and updating, by said second MSC, a home location register (HLR) serving said mobile station with said current location.

4. The method of claim 3 wherein said step of sending said signal indicating said current location further comprises the step of sending a location update signal from said first BSS to said second MSC.

5. The method of claim 4 wherein said location update signal comprises a Signal Connection Control Part (SCCP) based signal transmitted over an existing Signaling System No. 7 (SS7) telecommunications network connecting said first BSS to said second MSC.

6. The method of claim 3 wherein said step of transmitting said address representing said second MSC from said mobile station further comprises the initial step of retrieving said address from a subscriber identity module (SIM) attached to said mobile station.

7. The method of claim 3 wherein said address representing said second MSC includes an International Mobile Subscriber Identity (IMSI) number associated with said mobile station.

8. The method of claim 3 wherein said address presenting said second MSC includes a network address assigned to said second MSC.

9. The method of claim 1 wherein said step of routing said received data from said first BSS to said second MSC further comprises the step of transmitting said data over a dedicated link directly connecting said first MSC with said second MSC.

10. The method of claim 9 wherein said dedicated link comprises a Multiplexed Coded (MCD) E-1 link.

11. A method for communicating data between a base station controller (BSS) serving a mobile station and a mobile switching center (MSC) designated by said mobile station within a mobile telecommunications system, said method comprising the steps of:

receiving an identification number at said BSS identifying said MSC from said mobile station;

transmitting a signal from said BSS towards said MSC by using said received identification number as a destination address;

receiving said signal at said MSC; and processing said signal at said MSC to provide mobile service to said mobile station.

12. The method of claim 11 wherein said identification number includes an International Mobile Subscriber Identity (IMSI) number associated with said mobile station.

13. The method of claim 11 wherein said identification number includes a network address associated with said MSC.

14. The method of claim 11 wherein said step of transmitting said signal from said BSS to said MSC comprises the step of transmitting a Direct Transfer Application Part (DTAP) based signal performing a location update.

15. The method of claim 11 further comprising the steps of:

receiving a request at said BSS to originate a call connection from said mobile station;

forwarding said request to originate said call connection from said BSS to said MSC;

determining a called party associated with said request by said MSC; and establishing a call connection towards said called party by originating a call setup request to a connected Public Switched Telephone Network (PSTN) by said MSC.

16. The method of claim 15 wherein said BSS is directly connected to a visited MSC and wherein said step of forwarding said request from said BSS to said MSC further comprises the step of forwarding said request over a dedicated link connecting said visited MSC with said MSC.

17. A system for delivering data from a mobile station to a destination telecommunications terminal within a telecommunications network, said mobile station being served by a first base station subsystem (BSS) and a first mobile switching center (MSC) and said mobile station being associated with a second MSC as a home MSC, said system comprising:

an application module within said second MSC for providing mobile service to said mobile station;

means for receiving data transmitted by said mobile station at said first BSS;

means for routing said received data from said first BSS to said application module within said second MSC transparently through said first MSC;

means for recognizing said data at said application module within said second MSC;

means for routing said data from said second MSC to said destination telecommunications terminal.

18. The system of claim 17 further comprises means for dynamically establishing an A-interface between said first BSS and said second MSC transparently through said first MSC.

19. The system of claim 18 further comprising means for communicating data from said mobile station to said second MSC, said means for communicating further comprises:

means for transmitting an address representing said second MSC from said mobile station to said first BSS;

means for sending a signal indicating said mobile station's current location from said first BSS to said second MSC; and means for updating, by said second MSC, a home location register (HLR) serving said mobile station with said current location.

20. The system of claim 19 herein said means for sending said signal further comprises means for sending a location update signal from said first BSS to said second MSC.

21. The system of claim 20 wherein said location update signal comprises a Signal Connection Control Part (SCCP) based signal transmitted over an existing Signaling System No. 7 (SS7) telecommunications network connecting said first BSS to said second MSC.

22. The system of claim 19 wherein said means for transmitting said address representing said second MSC from said mobile station further comprises means for retrieving said address from a subscriber identity module (SIM) attached to said mobile station.

23. The system of claim 19 wherein said address representing said second MSC includes an International Mobile Subscriber Identity (IMSI) number associated with said mobile station.

24. The system of claim 19 wherein said address presenting said second MSC includes a network address assigned to said second MSC.

25. The system of claim 17 further comprising a dedicated link connecting said first MSC with said second MSC and wherein said means for routing said received data from said first BSS to said second MSC further comprises means for transmitting said data over said dedicated link.

26. A method for establishing a call connection from a mobile station to a destination terminal within a telecommunications network, said mobile station being served by a first base station subsystem (BSS) and a first mobile switching center (MSC) and associated with a second MSC as a home MSC, said method comprising the steps of receiving a request from said mobile station at said first BSS to establishing a call connection towards a called party terminal;

establishing a first call connection from said first BSS to said second MSC transparently through said first MSC without analyzing an address associated with said called party terminal;

analyzing said address associated with said called party terminal by said second MSC; and establishing a second call connection from said second MSC to said called party terminal by transmitting a call setup request by said second MSC.

27. The method of claim 26 wherein said first BSS is located in one geographic area and said second MSC is located in another geographic area and said first MSC and said second MSC are connected via a dedicated link.

28. The method of claim 27 wherein said dedicated link comprises a Multiplex coded (MCD) E-1 link.

29. The method of claim 26 further comprising the steps of:

receiving an identification number representing said second MSC from said mobile station at said first BSS;

communicating a location information associated with said mobile station by transmitting a signal using said received identification number as a destination address by said first BSS;

receiving said location information by said second MSC; and performing a location update with a home location register associated with said mobile station by said second MSC.

* * * * *

UNITED STATES PATENT AND TRADEMARK OFFICE
CERTIFICATE OF CORRECTION

PATENT NO. : 5,905,952          Page 1 of 2
DATED      : May 18, 1999
INVENTOR(S) : Joensuu et al.

It is certified that error appears in the above-identified patent and that said Letters Patent is hereby corrected as shown below:

| | |
|---|---|
| Column 1, line 14 | Replace "services" With --service.-- |
| Column 4, line 9 | Replace "50a" With --50a is-- |
| Column 4, line 10 | Replace "in the" With --in turn,-- |
| Column 4, line 11 | Replace "station" With --stations-- |
| Column 4, line 12 | Replace "the" With --all-- |
| Column 4, line 13 | Replace "with" With --within-- |
| Column 4, line 14 | Replace "50a" With --are-- |
| Column 4, line 16 | After "to" Insert --the-- |

UNITED STATES PATENT AND TRADEMARK OFFICE
CERTIFICATE OF CORRECTION

PATENT NO. : 5,905,952
DATED : May 18, 1999
INVENTOR(S) : Joensuu et al.

It is certified that error appears in the above-identified patent and that said Letters Patent is hereby corrected as shown below:

Column 4, line 19  Replace "has the"
With --has no--

Column 4, line 23  Replace "The"
With --This--

Signed and Sealed this

Twenty-third Day of May, 2000

Attest:

Q. TODD DICKINSON

*Attesting Officer*   *Director of Patents and Trademarks*